Patented Aug. 19, 1930

1,773,706

UNITED STATES PATENT OFFICE

FRANZ HENLE AND BARTHOLOMÄUS VOSSEN, OF HOCHST-ON-THE-MAIN, GERMANY, ASSIGNORS TO GENERAL ANILINE WORKS, INC., OF NEW YORK, N. Y., A CORPORATION OF DELAWARE

UNIFORM SULPHONIC ACIDS OF 6-CHLORO-2-AMINO-1-METHYLBENZENE AND PROCESS OF PREPARING THEM

No Drawing. Application filed April 30, 1928, Serial No. 274,157, and in Germany May 10, 1927.

Our present invention relates to uniform sulphonic acids of 6-chloro-2-amino-1-methylbenzene and a process of preparing them, more particularly to compounds of the following general formula:

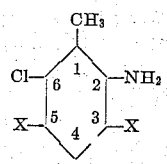

wherein one X stands for hydrogen or a sulfo group, and the other X for a sulfo group.

We have found that the 6-chloro-ortho-toluidine-sulphonic acids, namely 6-chloro-2-amino-1-methylbenzene-sulphonic acid of the formula:

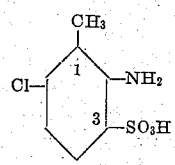

6 - chloro - 2 - amino - 1 - methylbenzene-5-sulphonic acid of the formula:

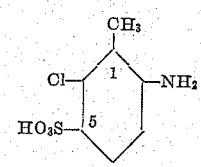

and 6-chloro-2-amino-1-methylbenzene-3.5-disulphonic acid of the formula:

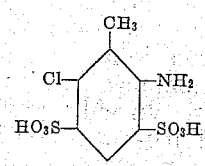

which have hitherto not been described in the literature can be obtained in an entirely uniform state each separately and free from isomerics by sulphonating 6-chloro-2-amino-1-methyl-benzene and graduating the intensity of the action of the sulfuric acid according to fixed conditions hereinafter set forth by suitably choosing the quantity and concentration of the acid, the temperature and the duration of the reaction. It is a surprising fact that it is possible to effect this graduation so exactly that the sulfo group which enters is in each case directed into one single definite position and that no mixtures are formed which have first to be separated from one another.

By heating one mol. of 6-chloro-2-amino-1-methyl-benzene together with exactly one mol. of monohydrate for a prolonged time (8 to 20 hours) to an elevated temperature (about 140° C. to 200° C.), in other words by subjecting the acid sulfate of 6-chloro-2-amino-1-methylbenzene to the known baking process, 6-chloro-2-amino-1-methylbenzene-5-sulphonic acid is obtained in a uniform state. Consequently, in comparison with unsubstituted ortho-toluidine the chlorine atom in 6-position has not caused the sulfo group to enter at another place.

By sulfonating 6-chloro-2-amino-1-methylbenzene dissolved in monohydrate by means of fuming sulfuric acid at a low temperature (below 100° C.) in such a manner that one mol. of sulfuric anhydride is used for one mol. of 6-chloro-2-amino-1-methylbenzene and that the quantity of anhydride does not exceed 10 to 12 per cent of the total amount of acid, 6-chloro-2-amino-1-methylbenzene-3-sulphonic acid is obtained in an entirely uniform state. This stands in a surprising contrast to the non-chlorinated ortho-toluidine which under the same conditions yields a mixture of 2-amino-1-methylbenzene-4-sulphonic acid and 2-amino-1-methylbenzene-5-sulphonic acid which can be separated only with difficulty. The undesired acid sulfonated in 4-position is in the case of 6-chloro-2-amino-1-methylbenzene not formed, not even in traces.

By sulfonating 6-chloro-2-amino-1-methylbenzene dissolved in monohydrate by means of fuming sulfuric acid at an elevated temperature (over 100° C.) in such a manner that at least 2 mols of sulfuric anhydride are used for one mol. of 6-chloro-2-amino-1-methylbenzene and that the quantity of anhydride exceeds 10 to 12 per cent of the total amount of acid, quite uniform 6-chloro-2-amino-1-methylbenzene-3.5-disulphonic acid is obtained. This stands again in an astonishing contrast to the non-chlorinated ortho-toluidine which under the same conditions yields the 2-amino-1-methylbenzene-4.5-disulphonic acid in a uniform state.

The influence which the chlorine substitution in 6-position has upon the course of the sulfonation could not be foreseen, but it constitutes the determining factor for the manufacture of the important chlorotoluidine-sulphonic acids on a technical scale. This may clearly be seen from the synopsis (arrangement) of the following structural formulæ:

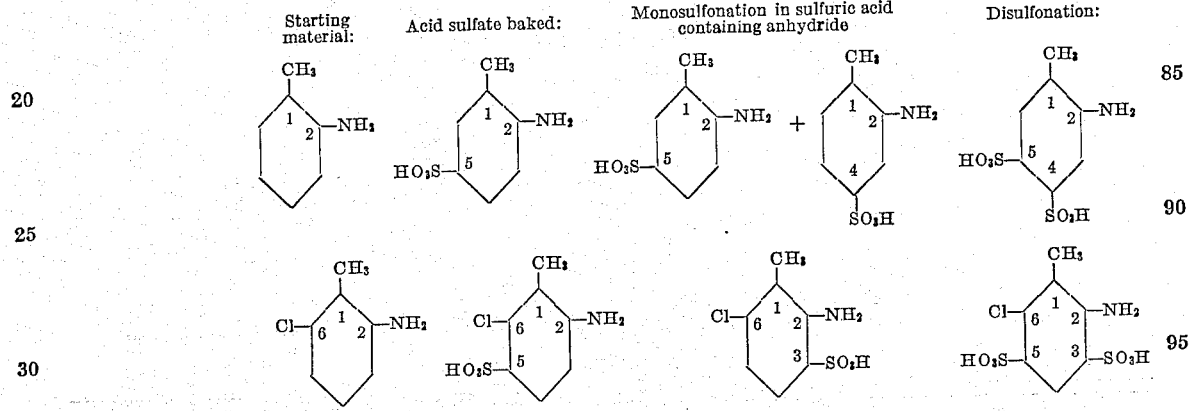

The constitution of the new acids has been ascertained partly by deamidizing them, partly by substituting chlorine for the amino group according to Sandmeyer's process and comparing the pairs of monochlorotoluene-sulphonic acids and dichlorotoluenesulphonic acids, which belong together and are formed by these transformations, with monochloro-toluenesulphonic acids and dichlorotoluene-sulphonic acids of known constitution.

The new chlorotoluidinesulphonic acids which can easily be obtained in the above-described manner, are important starting materials for the manufacture of azo dyestuffs, particularly of pyrazolone dyestuffs and thioindigo dyestuffs.

The two monosulphonic acids are whitish-gray powders which are scarcely soluble in cold water, sparingly soluble in hot water, soluble in concentrated sulfuric acid to a faintly brownish solution from which they are reprecipitated when it is diluted with water. The disulphonic acid is readily soluble even in cold water. It dissolves in concentrate sulfuric acid to a brownish solution from which it cannot be reprecipitated by the addition of water. The said three acids are all insoluble in the usual organic solvents.

For characterizing the three acids and distinguishing them from isomeric bodies there are advantageously used the sulfochlorides, sulfamides and sulfanilides, prepared from them with a quantitative yield and having a sharp melting point, of the pertaining chlorotoluenesulphonic acids and dichlorotoluenesulphonic acids which are obtained by deamidizing them or substituting chlorine for the amino group.

There are belonging together:

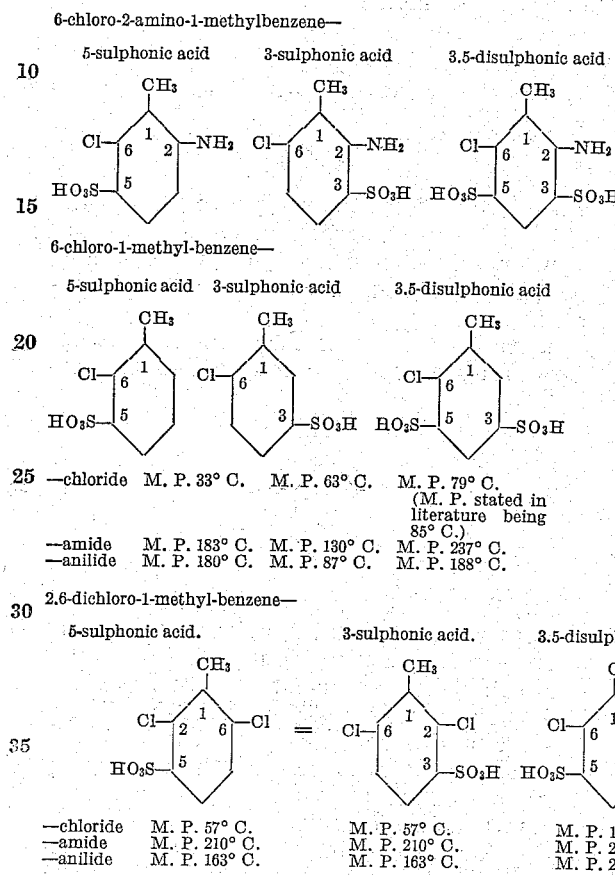

The following examples illustrate our invention, but they are not intended to limit it thereto; the parts are by weight:

(1) 240 parts of the acid sulfate from 1 mol. of 6-chloro-2-amino-1-methylbenzene and 1 mol of monohydrate are baked in known manner, at first at 140° C. for 7 hours, then at 170° C. for another 7 hours and finally at 180° C. for 5 hours. Thus 230 parts of 6-chloro-2-amino-1-methylbenzene-5-sulphonic acid of the formula:

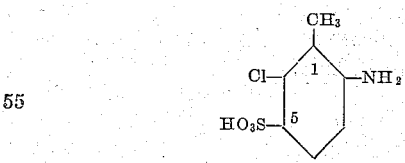

are obtained containing 91 per cent of the pure acid, the yield amounting to 94 per cent of the theory.

The 6-chloro-2-amino-1-methylbenzene-5-sulphonic acid is a whitish-gray powder, scarcely soluble in cold water, difficultly soluble in hot water, soluble in concentrated sulfuric acid to a faintly brownish solution from which the acid is re-precipitated on diluting with water. It is insoluble in the usual organic solvents.

(2) 141,5 parts of 6-chloro-2-amino-1-methylbenzene are introduced in the course of 1 to 2 hours into 1000 parts of monohydrate having a temperature of 20° C. The temperature rises during this operation to 60° C. There are then entered, while stirring and at a temperature of 70° C. to 90° C. 130 parts of fuming sulfuric acid containing 65 per cent of sulfuric anhydride. The quantities of the acids used correspond to 1 mol of sulfuric anhydride for 1 mol of 6-chloro-2-amino-1-methylbenzene. The quantity of anhydride amounts to 7,4 per cent of the total quantity of acid used. The whole is further stirred for 5 hours at 85° C. to 90° C. and then poured on a mixture of 1200 parts of water and 1200 parts of ice. After 10 to 12 hours' stirring the product of the reaction is filtered by suction. The body remaining on the filter contains 167,7 parts of 6-chloro-2-amino-1-methylbenzene-3-sulphonic acid of the formula:

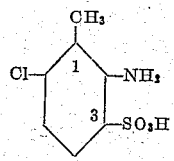

so that the yield amounts to 75,7 per cent of the theory, and the product can directly be worked up. For preparing the sodium salt it is mixed, while stirring, with 400 parts of water, just neutralized with caustic soda solution, again acidified with hydrochloric acid so that Congo paper is just colored blue, the product is filtered by suction and dried. Thus 223 parts of sodium 6-chloro-2-amino-1-methylbenzene-3-sulfonate are obtained containing 77 per cent of the pure product. The yield amounts to 70,5 per cent of the theory.

The product is a whitish-gray powder, scarcely soluble in cold water, difficultly soluble in hot water, soluble in concentrated sulfuric acid to a faintly brownish solution from which the acid is re-precipitated on diluting with water. It is insoluble in the usual organic solvents.

(3) 849 parts of 6-chloro-2-amino-1-methylbenzene are introduced in the course of 1 to 2 hours into 6500 parts of monohydrate heated to 80° C. There are then added in the course of 2 hours 1570 parts of fuming sulfuric acid containing 65 per cent of anhydride. (There are used for 1 mol of 6-chloro-2-amino-1-methylbenzene 2 mols of sulfuric anhydride which are contained in the total amount of the acids used. The quantity of anhydride amounts to 12,7 per cent of the acids used). The mixture is further stirred at about 100° C. for 4 hours, the temperature is then raised, while continuously stirring, to 140° C. and the mass is then stirred until it is cold. The sulfonation mixture is run into 3600 parts of a sodium chloride solution of 20 per cent strength. The whole is kept during three hours at 90° C., then stirred in the cold, filtered by suction and dried. Thus 2565 parts of a dry product are obtained containing 1578 parts (=87,2 per cent of the theory) of 6-chloro-2-amino-1-methylbenzene-3.5-disulphonic acid of the formula:

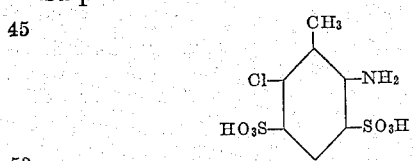

The disulphonic acid is readily soluble even in cold water. It dissolves in concentrated sulfuric acid to a brownish solution from which it can be re-precipitated by the addition of water. The acid is insoluble in the usual organic solvents.

We claim:

1. As new products, the compounds of the following general formula:

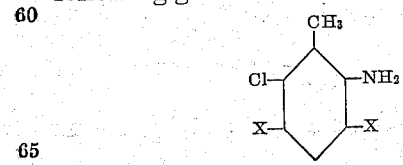

wherein one X stands for hydrogen or a sulfo group and the other X for a sulfo group, being whitish-gray powders, insoluble in organic solvents, soluble in concentrated sulfuric acid to a bluish solution.

2. As new products, the compounds of the following formula:

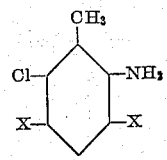

wherein one X stands for hydrogen and the other X for a sulfo group, being whitish-gray powders insoluble in organic solvents, soluble in concentrated sulfuric acid to a bluish solution.

3. As a new product, the 6-chloro-2-amino-1-methyl-benzene-3-sulphonic acid of the formula:

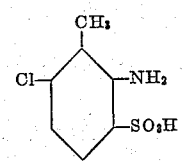

being a whitish-gray powder, insoluble in the usual organic solvents, scarcely soluble in cold water, difficultly soluble in hot water and soluble in concentrated sulfuric acid to a faintly brownish solution from which it is re-precipitated on diluting with water.

4. The process which comprises causing one molecular proportion of 6-chloro-2-amino-1-methyl-benzene to react with one molecular proportion of sulphuric acid anhydride in the presence of from about 6½ to 11 molecular proportions of sulphuric acid monohydrate, the temperature being maintained at not greater than 100° C.

5. The process which comprises dissolving one molecular proportion of 6-chloro-2-amino-1-methyl-benzene in sulphuric acid monohydrate and causing it to react with one molecular proportion of sulphuric acid anhydride dissolved in sulphuric acid monohydrate, the total amount of the sulphuric acid monohydrate present in the reaction mixture being from about 6½ to 11 molecular proportions, the temperature being maintained at not greater than 100° C.

6. The process which comprises causing one molecular proportion of 6-chloro-2-amino-1-methyl-benzene to react with one molecular proportion of sulphuric acid anhydride in the presence of from about 6½ to 8 molecular proportions of sulphuric acid monohydrate, at a temperature of from about 70° to about 90° C.

7. The process which comprises causing one molecular proportion of 6-chloro-2-amino-1-methyl-benzene to react with one molecular proportion of sulphuric acid anhydride in the presence of from about 6½ to 8 molecular proportions of sulphuric acid monohydrate, at a temperature of from about 70° to about 90° C., for five hours while stirring.

In testimony whereof, we affix our signatures.

FRANZ HENLE.
BARTHOLOMÄUS VOSSEN.